United States Patent [19]
Hailer

[11] 4,313,619
[45] Feb. 2, 1982

[54] INDEPENDENT WHEEL SUSPENSION

[75] Inventor: Gottfried Hailer, Waiblingen, Fed. Rep. of Germany

[73] Assignee: Daimler-Benz Aktiengesellschaft, Stuttgart, Fed. Rep. of Germany

[21] Appl. No.: 148,284

[22] Filed: May 9, 1980

[30] Foreign Application Priority Data

May 9, 1979 [DE] Fed. Rep. of Germany ....... 2918605

[51] Int. Cl.³ .............................................. B62D 7/16
[52] U.S. Cl. .................................. 280/691; 280/660; 280/675
[58] Field of Search ............... 280/93, 96.1, 660, 663, 280/664, 665, 666, 670, 671, 672, 673, 674, 675, 688, 690, 691, 693, 695, 696, 700, 701; 267/20 A

[56] References Cited

U.S. PATENT DOCUMENTS

| 2,069,924 | 2/1937 | Paton | 267/20 A |
| 2,164,470 | 7/1939 | Opolo | 280/696 |
| 2,303,545 | 12/1942 | Graham | 280/667 |
| 3,178,202 | 4/1965 | Kozicki | 280/696 |

FOREIGN PATENT DOCUMENTS

| 862208 | 3/1941 | France | 280/670 |
| 612701 | 11/1948 | United Kingdom | 280/671 |

Primary Examiner—Joseph F. Peters, Jr.
Assistant Examiner—Randall A. Schrecengost
Attorney, Agent, or Firm—Craig and Antonelli

[57] ABSTRACT

An independent vehicle wheel suspension arrangement which includes a pair of control arms disposed in a superimposed relationship. The control arms are articulated to a wheel carrier and are selectively in a mutually parallel or non-parallel position. A wheel suspension unit is supported on the wheel carrier with a steering knuckle of the wheel being also articulated to the wheel carrier along the steering axis of the steerable wheels. The control arms are articulated to the wheel carrier by means of ball and socket joints and the wheel carrier is supported against a twisting about a substantially perpendicular axis of rotation determined by the ball and socket joints, with respect to the vehicle body, by an additional moment supporting arm. The moment supporting arm is likewise connected to the wheel carrier and the vehicle body by ball and socket joints.

26 Claims, 15 Drawing Figures

INDEPENDENT WHEEL SUSPENSION

The present invention relates to a suspension arrangement and, more particularly, to an independent vehicle wheel suspension arrangement which includes two guide members formed as radius or control arms arranged in superimposed relationship, which arms are articulated to the wheel carrier and are selectively in a mutually parallel or non-parallel position, and with a wheel spring or suspension unit being supported on the wheel carrier and a steering knuckle of the wheels articulated to the wheel carrier in the steering axis of the steered wheels.

It has been customary for independent wheel suspension arrangements of steered wheels, as well as independent wheel suspension arrangements for non-steerable wheels, with a steering knuckle or wheel carrier supporting the suspension being guided by an upper wishbone and lower wishbone, for the wheel control forces and wheel control moments to respectively be absorbed at the points of articulation of the wheel carrier and wishbones by two bearing elements formed such as, for example, conical or tapered roller bearings arranged at a predetermined mutual spacing.

To prevent a jamming of the axial articulation of the wheel carrier and wishbones during a downward and upward deflection of the vehicle wheels, the swinging axes of the wishbones on the side of the wheel carrier and of the upper vehicle body must extend exactly in parallel to each other, or, with a wheel suspension arrangement having an antidive construction, the swinging axis must accurately intersect at a predetermined point. A desired oblique springing for the vehicle wheel and a parallel guidance of the steered wheels during a downward and an upward deflection of the vehicle wheels can normally be attained only by a tripartite steering and track rod design.

The aim underlying the present invention essentially resides in providing a wheel suspension arrangement of the aforementioned type which avoids any jamming in the joints of the guide members.

In accordance with advantageous features of the present invention, guide members or control arms are articulated to a wheel carrier by ball and socket joints with the wheel carrier being supported against a twisting about a substantially perpendicular axis of rotation determined by the ball and socket joints with respect to the vehicle body, by an additional moment supporting arm. The additional moment supporting arm is connected to the wheel carrier and the vehicle body by ball and socket joints universally angularly movable. In this connection, the term ball and socket joints is to be understood herein to generally include all those joints exhibiting an articulation capability which is free of constraint on all sides and/or corresponding to kinematic spherical joints but preferably the ball and socket joints herein are in the narrower meaning of the phrase.

By virtue of the use of ball and socket joints in accordance with the present invention, the position of such joints can arbitrarily be choosen and also be subsequently additionally varied without having to alter anything at the wheel suspension arrangement. Thus, for example, in a case of a bending of a control arm, perhaps due to an impact of the vehicle against an obstacle, in contradistinction to previously proposed wheel suspension constructions, the suspension arrangement of the present invention enables the vehicle to remain driveable since even with such a bending the suspension arrangement of the present invention ensures the existence of a constraint-free kinematic relationship.

Advantageously, according to the present invention, the pivot axis of the control arms may also be spatially arranged in an arbitrary fashion without concern for a jamming of the wheel suspension arrangement during a downward and upward deflection of the vehicle wheels.

By virtue of the provision of an additional moment supporting arm in accordance with the present invention, the moments which cannot be absorbed by the guide members or control arms are supported, since the all-around movable ball and socket joints of the control arms are only capable of absorbing the wheel control forces in the springing direction of the vehicle wheels.

More particularly, by a corresponding variation in the position of the ball and socket joints as well as the swinging axis of the control arms, it is possible in accordance with the present invention to affect and correct characteristic properties of the wheel suspension arrangement by, for example, arranging the moment supporting arms so as to be oriented obliquely downwardly in the forward direction and by an appropriate lever relationship at the wheel carrier and the control arms. Such characteristic properties may include, in addition to an oblique springing, the maintaining of the parallel relationship of the wheels during the springing movements, a reinforcing of the antidive effect during a braking of the vehicle, as well as changes in the negative and/or positive caster during movements of the vehicle wheels.

Additionally, the guide members or control axis of the present invention, conventionally constructed as wishbones, are preferably supported with their two control arms at the vehicle body by means of ball and socket joints so that all the joints of the wheel suspension arrangement are constituted by ball and socket joints. Advantageously and optionally all of the ball and socket joints can be identically constructed so as to enable an exchangeability thereof.

In accordance with further advantageous features of the present invention, with steered vehicle wheels, the moment supporting arm is articulated to the wheel carrier with a lever arm which is opposed, with respect to an axis of rotation determined by the joints of the control arms on the wheel carrier side, to a lever arm between the steering axis of the steering knuckle.

Advantageously, the lever arm of the moment supporting arm is a multiple of the lever arm of the steering knuckle at the wheel carrier with respect to the axis of rotation determined by the joints of the control arms on the wheel carrier side.

In accordance with further features of the present invention, the moment supporting arm, as viewed laterally, is arranged in parallel to a longitudinal direction of the vehicle and/or to at least one swinging axis of the control arms.

In accordance with yet further features of the present invention, the moment supporting arm, as viewed in a lateral view, is inclined at a predetermined angle with respect to the horizontal and the swinging axis of the control arms, as viewed laterally, intersect in a point behind the front wheels or in front of the rear wheels.

In accordance with the present invention, the swinging axis of the control arms are oriented, in a top view, at different inclinations with respect to the longitudinal axis of the vehicle and, for example, may be oriented in opposition and obliquely to the longitudinal axis of the vehicle.

Advantageously, the ball and socket joints between the control arms and the wheel carrier may be offset in a longitudinal direction of the vehicle or/and in a transverse direction of the vehicle with respect to each other and/or to a vertical central transverse wheel plane of the vehicle.

Accordingly, it is an object of the present invention to provide an independent vehicle wheel suspension arrangement which avoids, by simple means, shortcomings and disadvantages encountered in the prior art.

Another object of the present invention resides in providing an independent vehicle wheel suspension arrangement which ensures the prevention of a jamming of the articulation of the suspension arrangement during a downward and upward deflection of the vehicle wheels.

A further object of the present invention resides in providing an independent vehicle wheel suspension arrangement which ensures the maintenance of a parallel relationship of the wheels during springing movements of the wheels.

A further object of the present invention resides in providing an independent vehicle wheel suspension arrangement which is capable of absorbing wheel control forces in a springing direction of the vehicle wheels.

A still further object of the present invention resides in providing an independent vehicle wheel suspension arrangement which is capable of reinforcing the anti-dive effect during a braking of the vehicle.

Another object of the present invention resides in providing an independent vehicle wheel suspension arrangement which is simple in construction and therefore relatively inexpensive to manufacture.

A further object of the present invention resides in providing an independent vehicle wheel suspension arrangement which ensures the driveability of the vehicle even with a bending of the control or guide member thereof.

These and other objects, features, and advantages of the present invention will become more apparent from the following description when taken in connection with the accompanying drawings which show, for the purposes of illustration only, several embodiments in accordance with the present invention, and wherein:

Referring now to the drawings wherein like reference numerals are used throughout the various views to designate like parts and, more particularly, to FIGS. 1, 4, 7, 10, and 13, according to these Figures, a wheel carrier 20 and a steering knuckle 21a serve to support the respective wheels 21 and for guiding the respective wheels 21 about a steering axis x-x. The respective steering knuckles 21a are supported by the associated wheel carrier 20 and are guided in a springing direction, with respect to a body of the vehicle (not shown) by a lower guide member or control arm 22 and an upper guide member or control arm 23. At the same time, the wheel carrier 20 also serves for supporting a wheel suspension of spring unit which may be of any conventional constructions such as, for example, an air suspension means 24. The stroke of the wheel suspension unit corresponds in each case to a springing stroke of the wheel 21 so that the suspension unit can be of a more lightweight construction than the customary suspension unit supported on one of the control arms 22, 23.

Each of the two control arms or guide members 22, 23 are constructed as a wishbone and, as shown most clearly in FIGS. 3, 6, 9, 12, and 13, include two control arm sections 22a, 22b and 23a, 23b, respectively, converging toward the wheel carrier 20. The lower control arm 22 is articulated to the wheel carrier 20 by a ball and socket joint 25 and by the two control arm sections 22a, 22b to the vehicle body by means of ball and socket joints 26a, 26b. The upper control arm 23 is articulated to the wheel carrier 20 by ball and socket joints 27 and, by the two control arm sections 23a, 23b to the vehicle body by ball and socket joints 28a, 28b.

With the aid of the ball and socket joints 25, 27, the wheel carrier 28 is guided by the control arms 22, 23 in the spring direction. Since the ball and socket joints cannot absorb moments effective about an essentially vertical axis y—y determined by the ball and socket joints 25, 27, a moment supporting arm 29 is provided. The moment supporting arm 29 may be constructed as, for example, a push rod and be articulated to the wheel carrier 20 by means of a ball and socket joint 30 and to the vehicle body by means of a ball and socket joint 31.

Forces acting on the individual wheels 21 in the driving direction are transmitted in the steering axis x—x from the steering knuckle 21a to the associated wheel carrier 20 and tend to turn the wheel carrier about the axis y—y with a lever arm having a length designated b (FIGS. 1, 4, 7, and 10). The ensuing moments are absorbed by the moment supporting arm 29 having a lever arm designated a and transmitted to the vehicle body. In situations where the wheels are nonsteerable, the wheel 21 is normally directly supported on the wheel carrier 20 with no steering knuckle 21a forming a part of the wheel carrier 20 proper.

As shown most clearly in FIGS. 2, 5, 8, and 11, the control arms 22, 23, as seen in a lateral view, are arranged in mutual inclination in such a way that their associated swinging axes $z_1$, $z_2$, determined by the joints 26a, 26b and 28a, 28b intersect, in a longitudinal direction of the vehicle, for example, in the case of steered front wheels corresponding to the drawing with a driving direction $f_1$, behind the vertical transverse plane of the vehicle containing the wheel axis or also, for example, in a case of rear wheels which are not steered and with a driving direction $f_2$ opposed to the direction $f_1$ in front of the vertical transverse plane of the vehicle and, in both cases with a point designated M. Depending on the direction and inclination of the swinging axis $z_1,z_2$, the properties of the vehicle suspension system can be effected and reduced as desired with respect to braking compensation, i.e., anti-dive effect.

Figure 1:
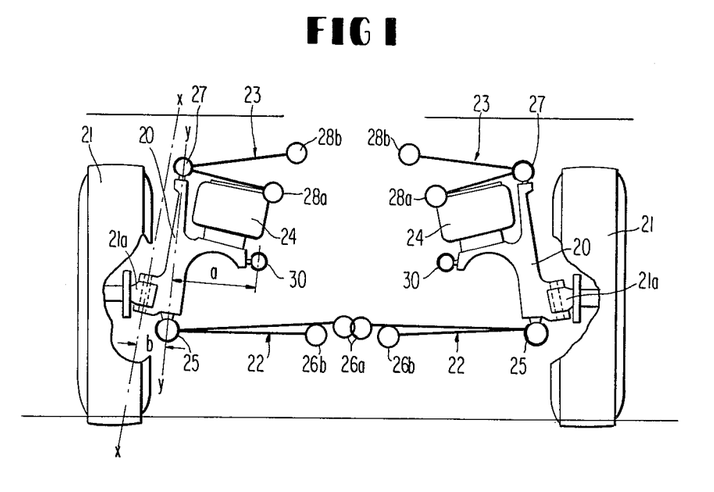
FIG. 1 is a partially schematic frontal view of a first embodiment of an independent vehicle wheel suspension arrangement in accordance with the present invention.
Figure 2:
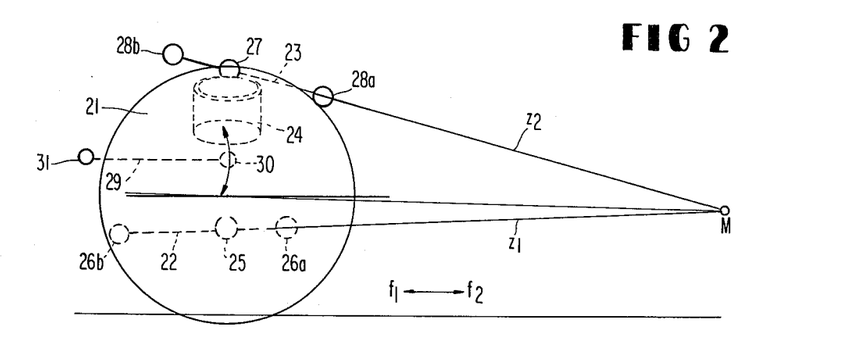
FIG. 2 is a schematic side view of the wheel suspension arrangement of FIG. 1.
Figure 3:
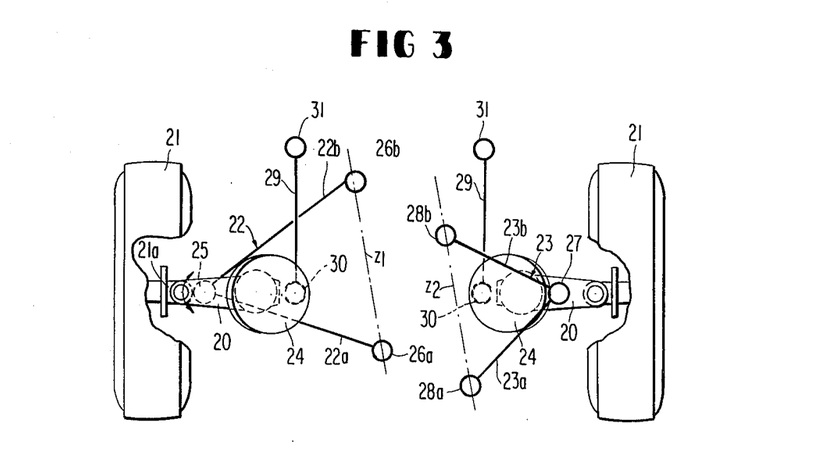
FIG. 3 is a schematic top view of the wheel suspension arrangement of FIG. 1, with the left hand side thereof illustrating a lower guide member and the right hand side thereof illustrating the upper guide member.

In the embodiment illustrated in FIGS. 1–3, the swinging axis $z_1$, $z_2$ of the control arms 22, 23 provided on the same vehicle side are oriented, as seen in a top view, oppositely to each other and obliquely to a longitudinal axis of the vehicle, as shown most clearly in FIG. 3; whereas, the moment supporting arm 29 is arranged in parallel to the longitudinal vehicle axis and in the horizontal direction. In case of a downward deflection of the wheels 21, the lower ball and socket joint 25 will thus move, with a driving direction $f_1$, somewhat toward the front and the upper ball and socket joint 27 will move somewhat toward the rear, correspond to an inclined springing which increases the downward deflection. At the same time, the pivotal motion of the moment supporting arm 29 effects a forward movement of the ball and socket joint 30 with an increasing downward deflection thereby resulting in a slightly negative toe-in change of the wheel 21 which has proven to be advantageous in case of, for example, front wheels of passenger motor vehicles.

Figure 4:
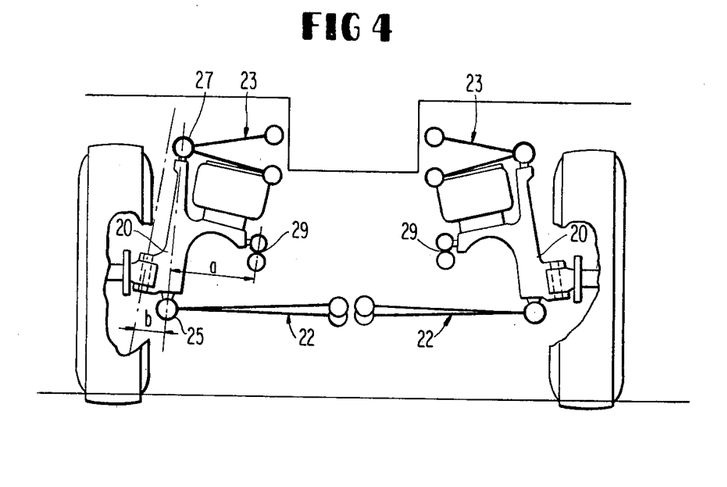
FIG. 4 is a partially schematic frontal view of a second embodiment of an independent vehicle wheel suspension arrangement in accordance with the present invention.
Figure 5:
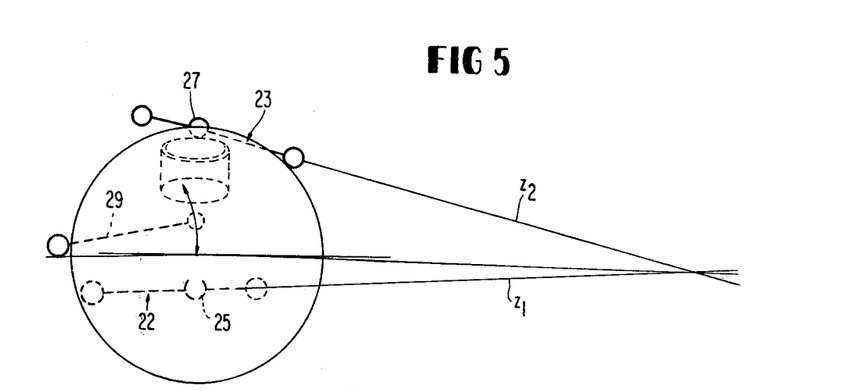
FIG. 5 is a schematic view of the wheel suspension arrangement of FIG. 4.
Figure 6:
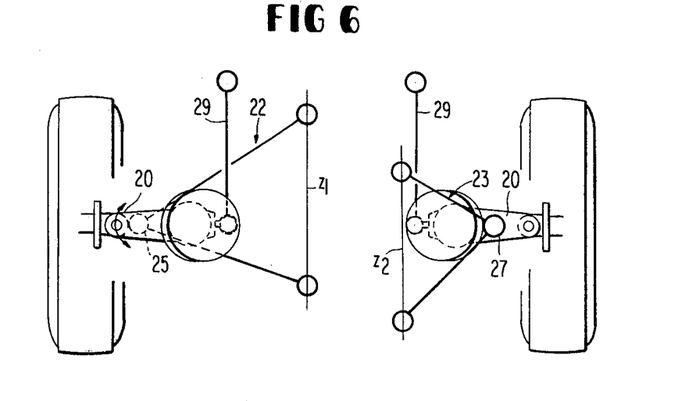
FIG. 6 is a schematic top view of the wheel suspension arrangement of FIG. 4 illustrating, respectively, the lower guide member and upper guide member at the right and left hand side thereof.

The construction of FIGS. 4–6 differs from the construction of FIGS. 1–3 in that the swinging axes $z_1,z_2$ of the control arms 22, 23 extend, when viewed from the top (FIG. 6) in parallel to the longitudinal direction of the vehicle; whereas, the moment supporting arm 29, though likewise extending in parallel thereto, is arranged so as to be inclined with respect to the horizontal, as seen in a lateral view (FIG. 5) thereby resulting, depending upon the driving direction, in over or under steering and/or in a negative or positive change in toe-in.

Figure 7:
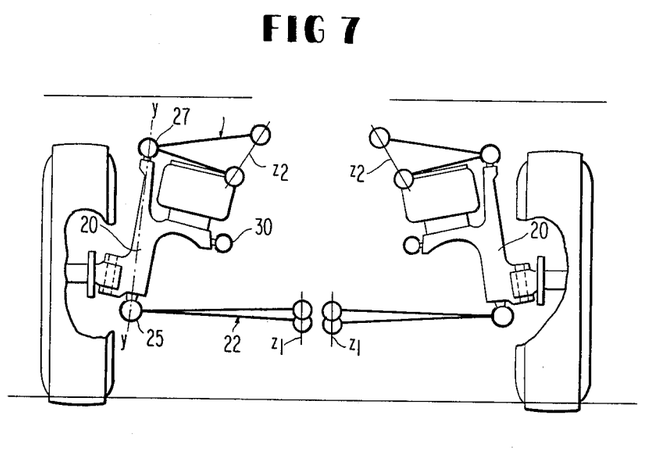
FIG. 7 is a partially schematic frontal view of a third embodiment of an independent vehicle wheel suspension arrangement in accordance with the present invention.
Figure 8:
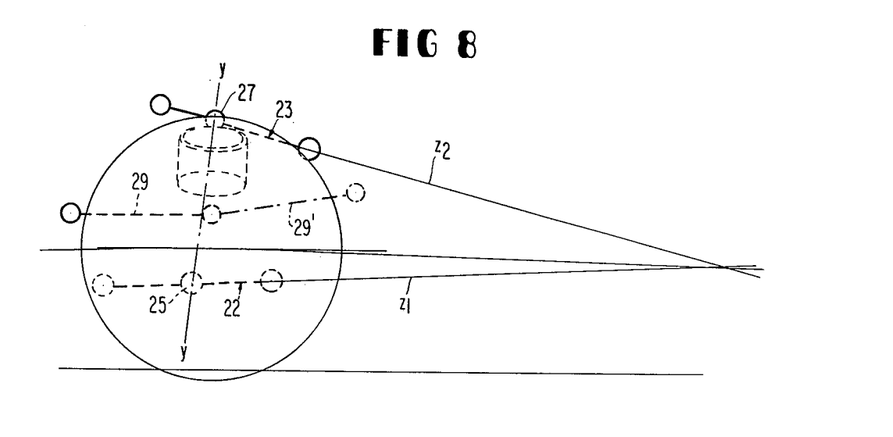
FIG. 8 is a schematic side view of the wheel suspension arrangement of FIG. 7.
Figure 9:
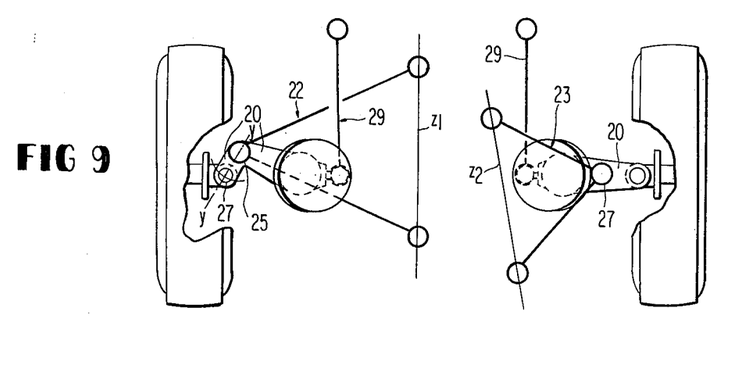
FIG. 9 is a schematic top view of the wheel suspension arrangement of FIG. 4 illustrating, respectively, the lower and upper guide members at the left and right hand side thereof.

In the construction of FIGS. 7–9, as viewed in a top view (FIG. 9), only the swinging axis $z_2$ of the upper control arm 23 is oriented obliquely to the longitudinal axis of the vehicle. The lower ball and socket joints 25, connecting the wheel carrier 20 with the lower control arm 22, is arranged so as to be offset with respect to a vertical transverse vehicle plane containing the center lines of the wheels so that the axis y—y (FIG. 8 or FIG. 9) results which is inclined to the vertical transverse vehicle plane, with a corresponding oblique springing of the wheel, which increases upon a downward deflection of the wheel.

Instead of a horizontally disposed moment supporting arm 29, it is also possible in accordance with the present invention to provide a moment supporting arm 29' which is arranged so as to be inclined, for example, also oriented oppositely to the longitudinal direction of the vehicle beginning from the wheel carrier 20 and this can also be done in all other cases.

Figure 10:
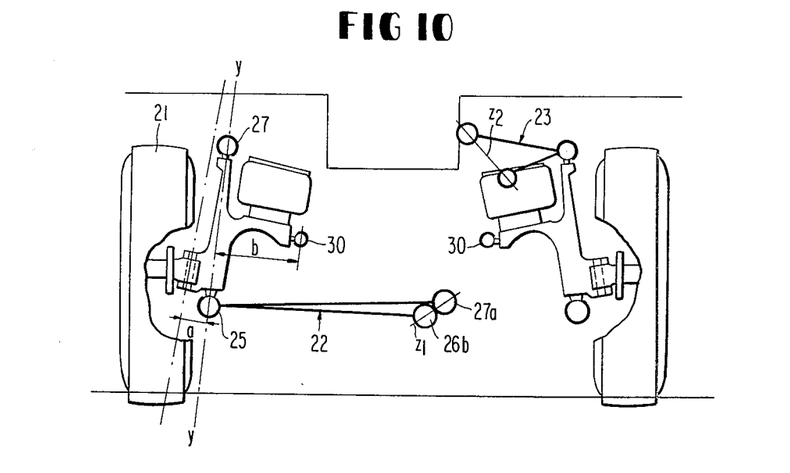
FIG. 10 is a partially schematic frontal view of a fourth embodiment of an independent vehicle wheel suspension arrangement in accordance with the present invention.
Figure 11:
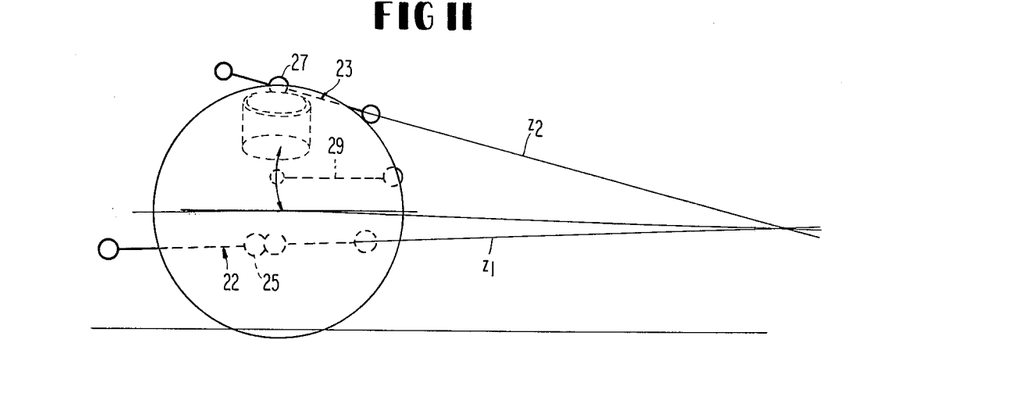
FIG. 11 is a schematic side view of the wheel suspension arrangement of FIG. 10.
Figure 12:
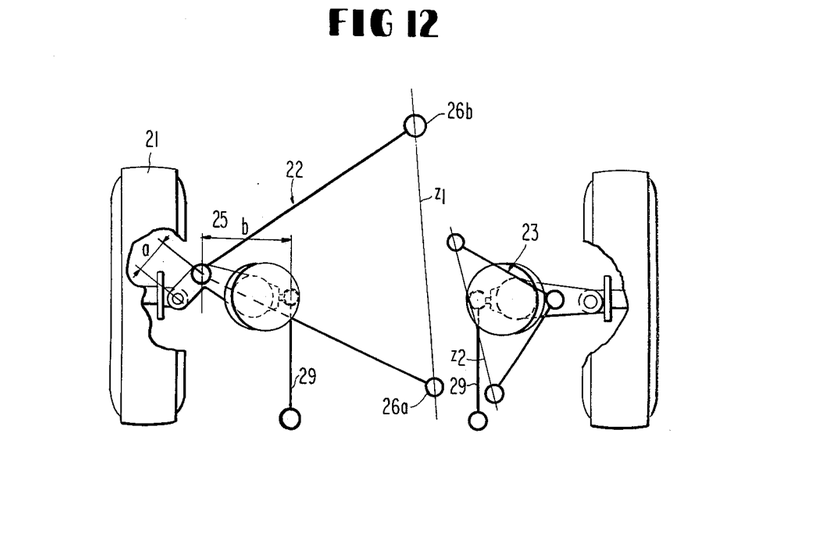
FIG. 12 is a schematic top view of the wheel suspension arrangement of FIG. 10 respectively illustrating the lower and upper guide members at the right and left hand side thereof.

Such an opposed arrangement of the moment supporting arm 29 is also included in the construction of FIGS. 10–12. The position of the articulation axis y—y of the wheel carrier 20 is the same as in the construction of FIGS. 7–9; whereas, the swinging axes $z_1,z_2$ of the control arms 22, 23, at the same vehicle side, similarly as in FIGS. 1–3 with respect to the longitudinal direction of the vehicle, extend obliquely in mutual opposition, wherein the bearing joints 26a, 26b, determining the swinging axis $z_1$, are arranged on the side of the vertical longitudinal center plane of the vehicle in opposition to the associated wheel 21 so that a change in the camber or toe-in/out of the wheels 21 can be reduced.

As can be seen from FIG. 12, the construction thereof approximately corresponds to the construction of FIGS. 4–6 with respect to the disposition of the swinging axes $z_1,z_2$ of the control arms 22, 23 which are shown in FIG. 12 in a top view in a superimposed relationship; however, the ball and socket joints 25, 26 are mutually offset in the driving direction, for example, with respect to the illustration in FIG. 7, assuming a driving direction of $f_1$.

Figure 13:
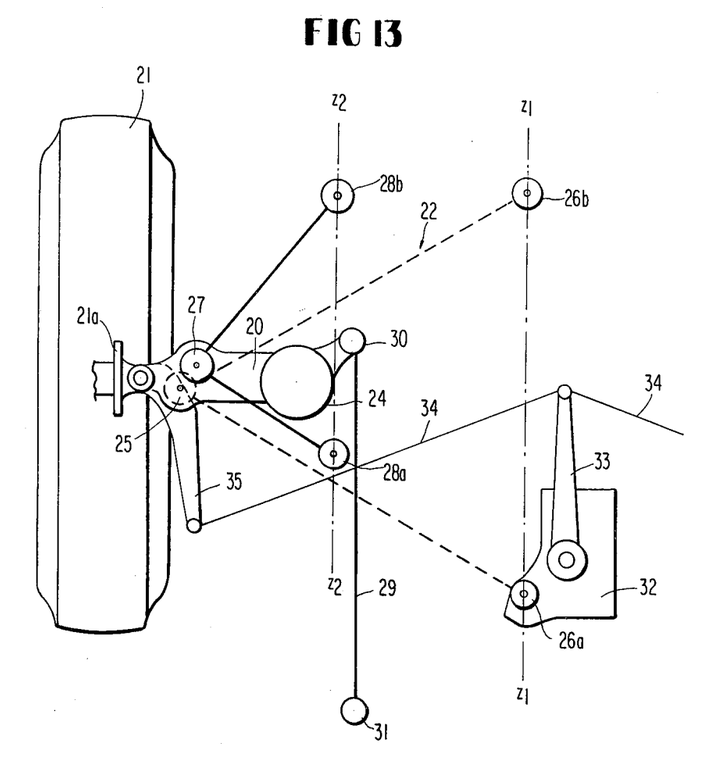
FIG. 13 is a partially schematic view of a fifth embodiment of a wheel suspension arrangement in accordance with the present invention with a portion of the steering system connected thereto.

As shown in FIG. 13, the joint 30 connecting the moment supporting arm to the wheel carrier may be offset in the longitudinal direction of the vehicle with respect to the perpendicular central transverse plane of the wheel 21.

FIG. 13 also provides an example of a schematic representation of the steering system for use with the independent wheel suspension arrangement of the present invention. More particularly, as shown in this Figure, the steering system includes a steering gear 32 operable directly or indirectly by a steering column in front of the driver seat which steering column is adapted to actuate track rods 34 by means of a pitman arm 33. The track rods 34 are articulated, to pitman arms 35 of the steering knuckles 21a.

As can readily be appreciated, the individual wheel suspension features of the vehicle suspension arrangement of the present invention determining the driving behavior of a vehicle, especially an automotive vehicle, may be combined and varied as desired without having to alter the joints construction in any manner whatsoever. Also, all of the ball and socket joints may be of an identical construction so as to facilitate an exchangeability of such joints. To especially reduce the shock or noise transmission, optionally, the ball and socket joints may also be provided with rubber shims or the like without, however, such shims being required for kinematic reasons or for changing the kinematics of the wheel suspension arrangement in any way.

Figure 14:
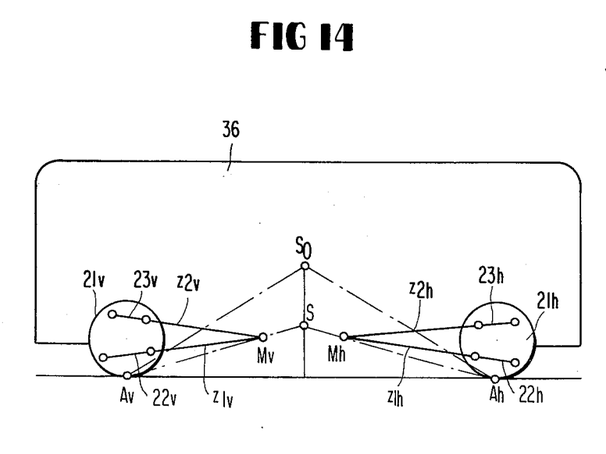
FIG. 14 is a partially schematic side view of a vehicle with a forward and rearward independent wheel suspension arrangement in accordance with the present invention.

FIG. 14 provides an example of the independent wheel suspension arrangement of the present invention arranged at the forward and rear of a vehicle 36 which is provided with steerable front wheels 21v and rear wheels 21h. The center of gravity of the vehicle 36 is assumed to be disposed at the point designated $S_o$ with the reference character S being a point in the transverse gravity center plane of the vehicle 36 at a level corresponding to a certain portion of the gravity center height depending on the desired portion of the brake compensation, i.e., anti-dive effect. The swinging axes $z_{1v}$, $z_{2v}$ of the front wheel suspension and $z_{1h}$, $z_{2h}$ of the rear wheel suspension are, in the arrangement of FIG. 14, advantageously oriented so that they intersect, as viewed in a side view of the vehicle, at a point $M_v$ and $M_h$, respectively, lying on a connecting line of a wheel impact point $A_v$ or $A_h$ with the point S lying in the transverse center of gravity plane. If the point S lies at half the level of $S_o$, then the pitching tendency of the vehicle during braking is likewise reduced to about one-half, i.e., an approximately 50% brake compensation is effected.

Figure 15:
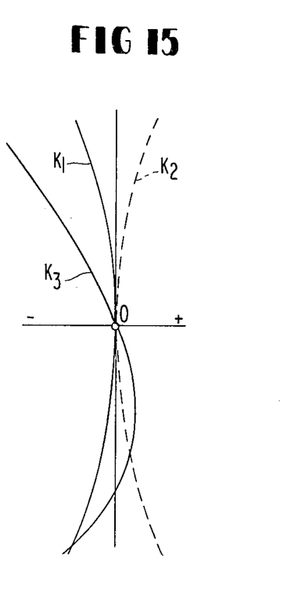
FIG. 15 is a diagram illustrating the relationship between a change in a toe-in in dependence upon spring characteristics of the vehicle suspension system.

FIG. 15 provides an example of the manner in which a change of the toe-in of the wheel can be obtained in dependence upon the position and size of the moment supporting arm in cooperation with the control arms 22, 23. More particularly, especially where the moment supporting arm 29 is arranged horizontally in the driving direction, it is possible to obtain a curve $K_1$ or $K_2$ which is symmetrical to the abscissa axis, i.e., axis of the toe-in change or substantially symmetrical thereto with a negative (opening) or positive (closing) change in toe-in. With an inclined moment supporting arm 29 such as, for example, shown in FIG. 5, it is possible to obtain a curve $K_3$ asymmetrical with respect to the abscissa axis. The direction of change in the toe-in, negative or positive, results here in each case from the direction of the moment supporting arm, for example, supporting arm 29 or 29' in FIG. 8 taking into consideration the driving directions $f_1$, $f_2$ or the arrangement at the front wheels or rear wheels of the vehicle.

While I have shown and described several embodiments in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. An independent wheel suspension arrangement for vehicles having wheels supported by a wheel carrier, the arrangement comprising a pair of control arms arranged in a superimposed relationship, and a wheel suspension means supported on the wheel carrier, characterized in that a ball and socket means is provided for articulatingly connecting each control arm to the wheel carrier, at least one additional moment supporting arm is provided for supporting the wheel carrier with respect to a body of the motor vehicle against a twisting about a substantially perpendicular axis of rotation defined by the ball and socket means, and in that further ball and socket means are provided for connecting a first end of the moment arm to the wheel carrier and a second end of the moment arm to the body of the vehicle.

2. A wheel suspension arrangement according to claim 1, characterized in that the control arms are articulated to the wheel carrier so as to be selectively in a mutual parallel or non-parallel position.

3. A wheel suspension arrangement according to claim 2, characterized in that a steering knuckle is articulated to the wheel carrier along a steering axis of the wheels of the vehicle.

4. A wheel suspension arrangement according to claim 3, characterized in that each of the control arms is constructed as a wishbone and includes two control arm sections, and in that additional ball and socket means are provided for articulatingly connecting respective ends of the control arm sections to the body of the vehicle.

5. A wheel suspension arrangement according to claim 4, characterized in that, with respect to the axis of rotation, the moment supporting arm is articulated to the wheel carrier with a first lever arm which is opposed to a further lever arm between the steering axis and the axis of rotation.

6. A wheel suspension arrangement according to claim 5, characterized in that the first lever arm has a length which is a multiple of the further lever arm.

7. A wheel suspension arrangement according to one of claims 4, 5, or 6, characterized in that the ball and socket means for articulatingly connecting respective ends of the control arm section to the body of the vehicle define swinging axis of the control arms, and in that the moment supporting arm, as seen in a lateral view, is arranged so as to be parallel to at least one of the pivot axis of the control arms or a longitudinal axis of the vehicle.

8. A wheel suspension arrangement according to claim 7, characterized in that the swinging axis of the control arms, as seen in a lateral view, intersect at a point located behind the front wheels of the vehicle or in front of the rear wheels of the vehicle.

9. A wheel suspension arrangement according to claim 7, characterized in that the swinging axis, as seen in a top view, are disposed at different inclinations to the longitudinal axis of the vehicle.

10. A wheel suspension arrangement according to claim 9, characterized in that the swinging axis of the control arms are disposed in opposition to each other and obliquely to the longitudinal axis of the vehicle.

11. A wheel suspension arrangement according to claim 10, characterized in that the ball and socket means for articulatingly connecting the control arms to the wheel carrier are offset with respect to each other in at least one of a longitudinal direction of the vehicle, a transverse direction of the vehicle, or a vertical transverse wheel plane of the vehicle.

12. A wheel suspension arrangement according to one of claims 1, 2, 3, 4, 5, or 6, characterized in that the moment supporting arm, as seen in a lateral view, is inclined at an angle to a horizontal plane.

13. A wheel suspension arrangement according to claim 1, characterized in that each of the control arms is constructed as a wishbone and includes two control arm sections, and in that additional ball and socket means are provided for articulatingly connecting respective ends of the control arm sections to the body of the vehicle.

14. A wheel suspension arrangement according to claim 1, characterized in that with respect to the axis of rotation, the moment supporting arm is articulated to the wheel carrier with a first lever arm which is opposed to a further lever arm between the steering axis and the axis of rotation.

15. A wheel suspension arrangement according to claim 14, characterized in that the first lever arm has a length which is a multiple of the further lever arm.

16. A wheel suspension arrangement according to claim 1, characterized in that ball and socket means are provided for articulatingly connecting the control arms to the body of the vehicle and for defining swing axes of the control arms, and in that the moment supporting arm, as seen in a lateral view, is arranged so as to be parallel to at least one of the pivot axis of the control arms or a longitudinal axis of the vehicle.

17. A wheel suspension arrangement according to claim 16, characterized in that the swinging axis of the control arms, as seen in a lateral view, intersect at a point located behind the front wheels of the vehicle or in front of the rear wheels of the vehicle.

18. A wheel suspension arrangement according to claim 16, characterized in that the swinging axis, as seen in a top view, are disposed at different inclinations to the longitudinal axis of the vehicle.

19. A wheel suspension arrangement according to claim 16, characterized in that the swinging axis of the control arms are disposed in opposition to each other and obliquely to the longitudinal axis of the vehicle.

20. A wheel suspension arrangement according to one of claims 1 or 16, characterized in that the ball and socket means for articulatingly connecting the control arms to the wheel carrier are offset with respect to each other in at least one of a longitudinal direction of the vehicle, a transverse direction of the vehicle, or a vertical transverse wheel plane of the vehicle.

21. A wheel suspension arrangement according to one of claims 1 or 16, characterized in that a further moment supporting arm is arranged in opposition to the first mentioned supporting arm and extends in a longitudinal direction of the vehicle.

22. A wheel suspension arrangement according to claim 21, characterized in that the further moment supporting arm, as seen in a lateral view, is disposed at an inclination with respect to a horizontal plane.

23. A wheel suspension arrangement according to claim 22, characterized in that with respect to the axis of rotation, the moment supporting arm is articulated to the wheel carrier with a first lever arm which is opposed to a further lever arm between the steering axis and the axis of rotation.

24. A wheel suspension arrangement according to claim 22, characterized in that the swinging axis, as seen in a top view, are disposed at different inclinations to the longitudinal axis of the vehicle.

25. A wheel suspension arrangement according to claim 22, characterized in that the swinging axis of the control arms are disposed in opposition to each other and obliquely to the longitudinal axis of the vehicle.

26. A wheel suspension arrangement according to claim 22, characterized in that the ball and socket means for articulatingly connecting the control arms to the wheel carrier are offset with respect to each other in at least one of a longitudinal direction of the vehicle, a transverse direction of the vehicle, or a vertical transverse wheel plane of the vehicle.

* * * * *